Patented May 4, 1926.

1,583,154

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

INSECTICIDAL COMPOSITION.

No Drawing. Application filed August 22, 1922. Serial No 583,618.

*To all whom it may concern:*

Be it known that I, HENRY HOWARD, a citizen of the United States, residing at Cleveland, in the county of Cuyahoga and State of Ohio, have invented certain new and useful Improvements in Insecticidal Composition, of which the following is a specification.

This invention relates to suspensible sulfur compositions designed for use as insecticides.

Sulfur in elemental form is known to possess desirable insecticidal properties. It has been applied in dry powdered form and in the form of a simple aqueous suspension but the use of sulfur in either of these two ways is not satisfactory. Accordingly it has been attempted to provide a better method for the application of sulfur as an insecticide. Such methods include the use of solutions of loosely bound sulfur compounds such as the polysulfides and the use of liquid sulfur suspensions containing a colloiding or suspending agent such as glue. My invention relates to an improvement in the latter form of sulfur composition.

The sulfur composition of my invention and its method of preparation are illustrated in the following specific example.

50 parts by weight of sulfur, 5 parts by weight of 40° Bé. silicate of soda solution, 2½ parts by weight of glue and 42½ parts by weight of water are mixed and ground together until a creamy homogeneous liquid is formed.

The composition so prepared possesses many of the recognized desirable characteristics of liquid sulfur suspensions designed for use as insecticides. The sulfur is in a very finely divided condition, probably being in a colloidal condition or approaching the colloidal condition. The suspension is very stable. Separation of sulfur from the suspending liquid takes place very slowly and the separation is not extensive or permanent. Slight agitation is sufficient to reestablish the uniform creamy consistency of the composition even after long standing.

In use the sulfur is held in place on the object treated by the silicate of soda and glue in the composition. The composition is capable of being diluted to many times its volume with water or other liquids such as aqueous solutions of glue or silicate of soda or both.

It is to be understood that the invention is not limited to the specific ingredients, proportions of ingredients and method of compounding them described in the specific example. The proportions of the ingredients may be varied within reasonable limits. The glue may be substituted in whole or in part by other materials, such as starch, dextrine, soap, and the like. The ingredients may be mixed in various ways as will be readily understood.

The sulfur suspension described above is improved by the addition thereto of a relatively small quantity of a finely divided inert material having colloidal characteristics. A material which I have found to be of particular value in this relation is a high grade yellow colloidal clay known as wilkinite, being a variety of the clay known as Wyoming bentonite. By adding about .75 of one percent of powdered wilkinite to the composition described in the specific example, which composition is a freely flowing liquid, the sulfur suspension is improved and the composition is converted to a pasty product better suited for storage and shipment than the fluent product. The wilkinite preferably is added to the finished composition produced by compounding the sulfur, glue, sodium silicate solution and water or their equivalents but it may be incorporated with the other ingredients at some earlier stage in the preparation of the composition, for instance, it may be added to the mixture of ingredients prior to the grinding operation. The proportion of wilkinite to the other ingredients may be varied within reasonable limits. The greater the proportion of wilkinite used the more viscous will be the paste formed. It is noted however that the wilkinite or other equivalent colloidal inorganic material added to the composition as described is not added as a diluent and cannot be regarded as such since it is used in such small proportion that its diluting effect is practically negligible.

I claim:

1. An insecticidal composition comprising sulfur and silicate of soda.

2. An insecticidal composition comprising sulfur, silicate of soda, and glue.

3. An insecticidal composition comprising sulfur, silicate of soda, and a colloidal clay.

4. An insecticidal composition comprising sulfur, silicate of soda, glue, and wilkinite.

5. A suspension of sulfur suitable for use as an insecticide comprising sulfur, silicate of soda, and a liquid vehicle.

6. A suspension of sulfur suitable for use as an insecticide comprising sulfur, silicate of soda, wilkinite, and water.

7. A sulfur suspension suitable for use as an insecticide comprising sulfur, silicate of soda, glue, wilkinite, and water.

8. An insecticidal composition comprising about 50 parts by weight of sulfur, 5 parts by weight of a 40° Bé. silicate of soda solution, 2½ parts by weight of glue, and not more than 1 part by weight of wilkinite.

In testimony whereof, I affix my signature.

HENRY HOWARD.